United States Patent [19]

Heiland

[11] Patent Number: 4,514,625

[45] Date of Patent: Apr. 30, 1985

[54] ALARM SYSTEM TO SECURE A PASSAGE

[75] Inventor: Bernd Heiland, Warendorf, Fed. Rep. of Germany

[73] Assignee: (Firma) Aug. Winkhaus, Fed. Rep. of Germany

[21] Appl. No.: 397,810

[22] Filed: Jul. 13, 1982

[30] Foreign Application Priority Data

Jul. 16, 1981 [DE] Fed. Rep. of Germany ....... 3128073

[51] Int. Cl.³ .................. G08B 13/08; G08B 13/18
[52] U.S. Cl. .................................. 250/221; 250/578; 340/556
[58] Field of Search ............... 250/221, 208, 209, 578; 340/555, 556, 557

[56] References Cited

U.S. PATENT DOCUMENTS

| 3,235,738 | 2/1966 | Kress et al. ........................ 250/221 |
| 3,739,372 | 6/1973 | Schlisser et al. ................ 250/221 X |
| 3,752,978 | 8/1973 | Kahl, Jr. et al. . |
| 3,805,064 | 4/1974 | Kornylak ........................... 250/221 |

FOREIGN PATENT DOCUMENTS

| 2109859 | 9/1971 | Fed. Rep. of Germany . |
| 2129666 | 12/1972 | Fed. Rep. of Germany . |
| 2540741 | 3/1977 | Fed. Rep. of Germany . |
| 1413414 | 11/1975 | United Kingdom . |

Primary Examiner—Edward P. Westin
Attorney, Agent, or Firm—Toren, McGeady and Stanger

[57] ABSTRACT

A security system for an opening such as a door, window, or the like wherein the opening is defined with a generally planar orientation having at least a pair of generally diametrically opposed corners, the system including light transmitters arranged in the vicinity of at least one of the corners emitting light from the one corner within an angle limited by the sides of the one corner, the light being directed across the opening in a direction toward the other of the corners, and light receivers for sensing light emitted from the light transmitters, the light receivers being arranged on at least one of the sides of the opposite corner. In one aspect of the invention, the light transmitters are arranged in the vicinity of only one of the corners and the light receivers are arranged on both sides of the opposed corner. In a second aspect of the invention, the light transmitters are arranged in the vicinity of both of the opposed corners and the light receivers are arranged on one of the sides of each of the opposed corners to receive light from the light transmitters arranged in opposed relationship thereto.

9 Claims, 7 Drawing Figures

ALARM SYSTEM TO SECURE A PASSAGE

The present relates generally to security systems for securing an opening or a passageway such as a door or a window wherein light barrier means are provided with light emitters and light receivers arranged in opposed relationship across the passageway, the light receivers sensing light emanating from an opposed light transmitter.

An alarm system of the type to which the present invention relates is described and shown in German Offenlegungsschrift No. 27 39 636. Such an alarm system is advantageous and generally reliable in operation. However, it has been found that certain improvements can be effected in systems of this type in that the systems can be simplified and also can be arranged to reduce manufacturing costs and increase system reliability.

The present invention is based upon improvements in security systems involving light barrier means wherein light emitters and light receivers are arranged in opposed patterns on opposite sides of the passageway or opening to be secured.

SUMMARY OF THE INVENTION

Briefly, the present invention may be described as a security system for an opening or passageway such as a door, window, or the like comprising means defining the opening with a generally planar orientation having at least a pair of generally diametrically opposed corners, light transmitter means arranged in the vicinity of at least one of said corners emitting light from said one corner within an angle limited by the sides of said one corner, said light being directed across said opening in a direction toward the other of said corners, and light receiver means for sensing said light emitted from said light transmitter means, said light receiver means being arranged on at least one of the sides of the opposite corner.

In one specific aspect of the invention, the light transmitter means are arranged in the vicinity of only one of the corners and the light receiver means are arranged on both the sides of the opposed corner.

In a second aspect of the invention, the light transmitter means are arranged within the vicinity of both of said opposed corners, and the light receiver means are arranged on one of the sides of each of the opposed corners to receive light from the light transmitter means arranged in opposed relationship thereto.

It will be found that both aspects of the invention have in common that the light transmitter means operate to irradiate the limited space of the passageway or opening which is to be secured. In accordance with the first aspect of the invention, the space to be irradiated is limited by the two sides of a corner of the passage. In the second aspect of the invention, two light barriers are formed each consisting of light transmitters and light receivers, and the space to be secured is limited on one side by a side of the passageway or opening and on the other side by the adjoining terminations of the light barriers.

Accordingly, the present invention differs from the type of security device where the light transmitter is directed, for example, to the center of the passage edge and therefore would be required to irradiate a space of 180°. In the present invention, the space to be irradiated in accordance with the first aspect of the invention extends over only an angle of 90° when a passageway having a rectangular cross-section is involved. Thus, a device arranged in accordance with the first aspect of the invention may extend over a smaller angle. Thus, the irradiating light and the intensity thereof may be concentrated over a smaller space thereby affording better utilization of the security system.

By provision of the embodiments of the invention, the passageway to be secured may therefore be advantageously exposed to light rays from one or two areas or sources. Additional light transmitters and their support areas as well as additional wiring is therefore conserved.

Regarding the security of the system, the embodiments of the invention provide an improvement inasmuch as the light receivers are difficult to detect and therefore an alarm in accordance with the invention is more difficult to disconnect without proper authorization.

In accordance with a more detailed arrangement of the invention, the light transmitters are arranged in the areas of the sides of the passageway or opening which adjoin the corners. In this aspect, the transmitters are well protected against damage or detection, particularly when arranged in a window or similar opening wherein the placement surface of the windowsill is only impaired to a minor extent.

In accordance with a further aspect of the invention, it is possible to concentrate the light beams of the light transmitters to an approximately wedge-shaped configuration, with diverging sections of the passage being secured wherein these sections are arranged to adjoin each other or to lie one above the other. Of course, as a result of this concentration of the light beams, the available energy may be utilized more advantageously.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
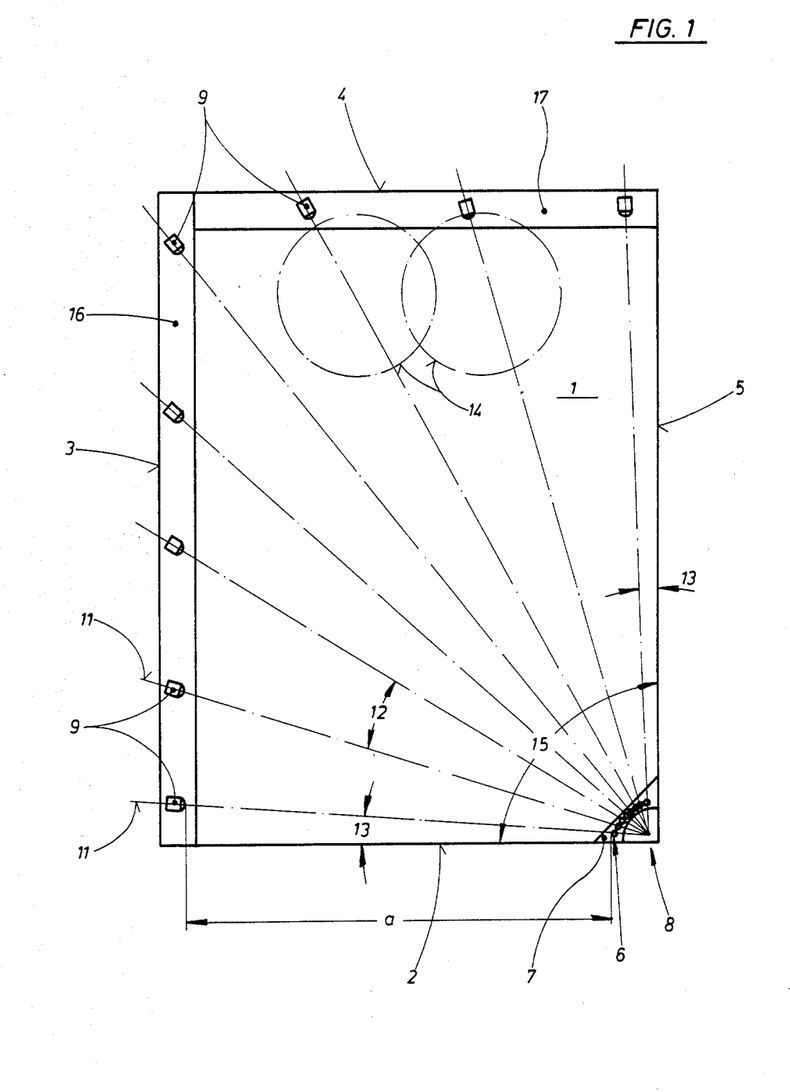
FIG. 1 is a schematic diagram showing a first embodiment of the invention.

Referring now to FIG. 1, there is shown a basic system in accordance with the first embodiment of the invention wherein an opening, passageway, or portal such as a window 1 is irradiated with light in the transverse direction thereof in order to secure the passageway or portal against unauthorized traffic. The window 1 shown in FIG. 1 is formed with a generally quadrilaterial configuration having sides 2, 3, 4, and 5. The alarm system provided comprises a plurality of light transmitters 6 which are arranged within a housing 7 in the lower right-hand corner 8 of the window 1. Located opposite the lower right-hand corner 8 is a diagonally opposed corner defined by the window sides 3 and 4. Located on each of the sides 3 and 4 are a plurality of light receivers 9, with each of the light receivers 9 being arranged to sense the light emitted from one of the light transmitters 6 located in the corner 8.

The light transmitters 6 and the light receivers 9 are aligned with respect to each other in a manner indicated by the dash-dot lines 11 which at the same time schematically represent the directions of propagation of the light beams from the transmitter 6. The propagation directions 11 enclose acute angles 12, with the light beams indicated on the two outer sides of the overall pattern being indicated by the angle 13. The angle 13 which is formed between the outermost light beams and the sides 2 and 5, respectively, of the window 1 is smaller than the angle 12.

Assigned to each of the light transmitters 6 is a lens (not shown) which operates to concentrate the light beams. Each of the beams is formed with a beam cross-section 14 which, as indicated by the dash-dot lines in FIG. 1, tend to overlap insofar as the area of their useful luminous intensity is concerned in such a way that the light transmitters project onto the diagonally opposite sides 3 and 4 of the window 1 a light beam which is formed with an approximately oblong cross-sectional configuration. The arrangement is designed in such a way that the light intensity before the light receivers 9 is approximately equal.

As indicated in FIG. 1, the light beams are concentrated in an area which extends between the sides 2 and 5 which enclose an angle 15 of 90°.

As can also be seen from FIG. 1, the light receivers 9 of one of the sides 3, 4 are arranged within an elongated housing 16, 17 which will always extend over the entire length of the side 3, 4.

Figure 2:
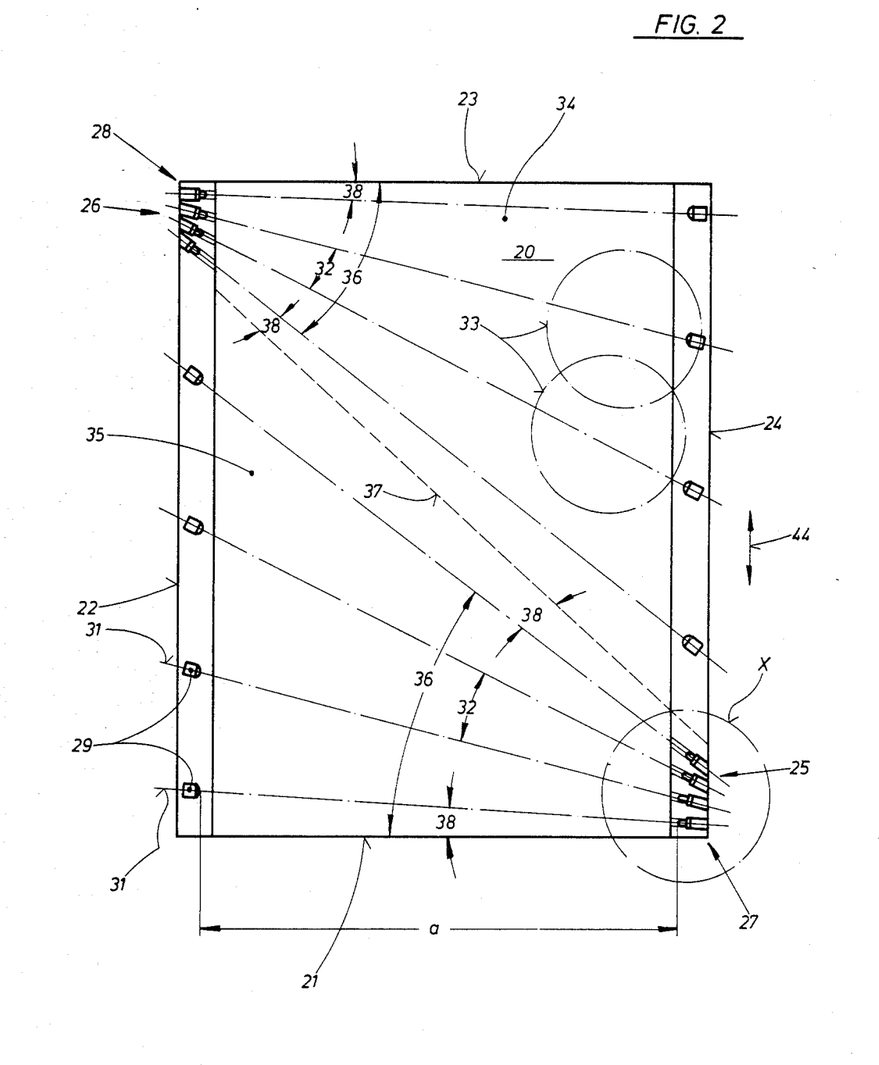
FIG. 2 is a schematic diagram showing a second embodiment of the invention.

In the system of the invention exemplified in the second embodiment according to FIG. 2, the portal or passageway is exemplified by a window 20 having sides 21, 22, 23, and 24. In this embodiment, two groups of light transmitters 25 and 26 are provided arranged, respectively, in two diagonally opposite corners 27 and 28 of the window 20. The transmitters 25 and 26 each comprise several individual transmitters which are located adjacent each other so that the window 20 is irradiated with light beams which extend within a plane transversely of the direction of passage through the window 20. The arrangement is such that the light transmitters 25 and 26 are arranged in the area of the ends of the vertical sides 22 and 24 which face the corners 27, 28. Each of the light transmitters 25 and 26 has assigned thereto a light receiver 29 which is located always opposite the specific transmitter to which it is assigned. As will be seen in FIG. 2, the receivers 29 are located on the sides 22 and 24 of the window 20. Thus, each of the corners 27, 28 has light receivers arranged on at least one of the sides defining the corners.

In FIG. 2, the direction of propagation of the light beams emitted from the transmitters 25 and 26 is identified by dash-dot lines 31. Between the propagation directions 31 which represent the longitudinal axes of the light beams from the light transmitters 25, 26 there is formed an enclosed acute angle 32. The beams are formed with cross-sectional areas 33 indicated in dash-dot lines which overlap so that the beams transmitted from the transmitters 25, 26 will be projected at the opposite sides 22 and 24 in a light pattern having an approximately oblong configuration.

It will be seen that the system of FIG. 2 operates to essentially provide two light barrier systems formed respectively of the light transmitters 25 and 26 and their respective light receivers. The two systems operate to cover two sectors 34 and 35 of the window 20, both of which lie in the transverse plane of the window 20 and each of which cover an angle of approximately 45° limited on one side by a side 21 or 23 of the window and on the other side by the adjoining respective sector 34, 35. The boundary between the sectors 34, 35 is shown in a theoretical sense by the dashed line 37. This boundary essentially relates to the boundary between the useful luminous intensities of the light in each sector.

The light beams are arranged so that the outermost beams form acute angles 38 with the sides 21, 23 of the window 20 and with the barrier 37. Thus, for example, the lowermost light beam identified by the dash-dot line 31 forms an angle 38 with the side 21 and the light beam within the sector 35 next adjacent the barrier 37 forms an equal angle 38 with the barrier 37. Similarly, angles 38 are formed between the side 23 and the light beam next adjacent thereto in the sector 34 and between the barrier 37 and the light beam within the sector 34 next adjacent thereto.

Each of the acute angles 38 is dimensioned to be only approximately half as large as the angles 32 between adjacent light beams.

The light transmitters 25 and 26 are of the same construction and differ from each other only in that one is rotated with respect to the other by 180° and that they are arranged opposite each other. Therefore, the transmitters 25, 26 will irradiate the window 20 from opposite directions through congruent sections 34, 35 which, when taken together, form a rectangle of the size of the cross-section of the window 20.

Figure 3:
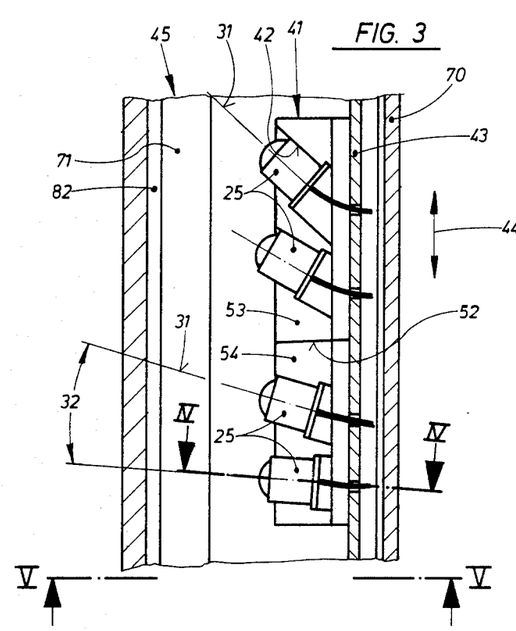
FIG. 3 is a sectional view showing, on an enlarged scale and in greater detail, the portion X shown in FIG. 2.
Figure 5:
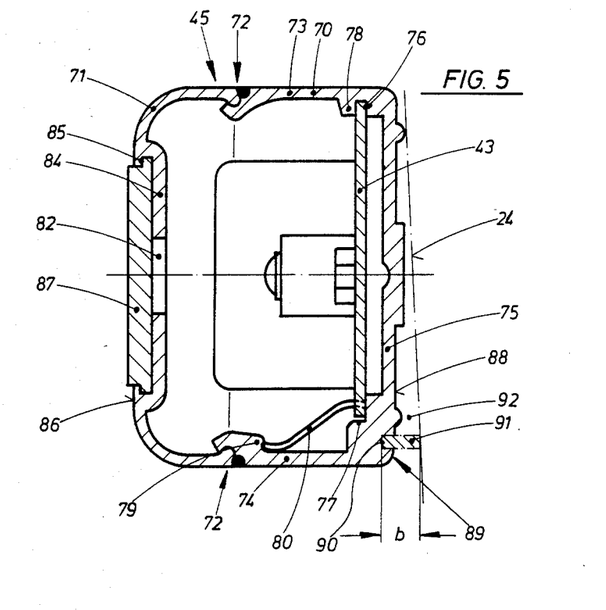
FIG. 5 is a sectional view taken along the line V—V of FIG. 3.

As is shown in FIG. 3, the light transmitters 25 and 26 are held in the corner 27, 28 in a support 41 in two-stage receiving bores 42 having longitudinal axes which coincide with the directions of propagation 31 and which are thus correspondingly inclined. The support 41 is attached at a mounting plate 43 which extends transversely to the window plane and which is arranged so as to be slidable and fixable in the circumferential direction in a housing 45 which extends in the circumferential direction 44 over the entire length of the respective inner faces 22, 24. The cross-section of the housing 45 is shown in FIG. 5.

Figure 4:
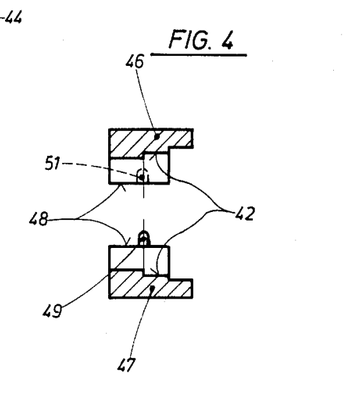
FIG. 4 is a partial sectional view taken along the line IV—IV of FIG. 3.

The support 41 consists of two havles 46 and 47 which, as shown in FIG. 4, define a separating line 48 which lies in the plane of the window and which extends in the circumferential direction 44 of the window 20. The halves 46 and 47 may be aligned relative to each other by means of a centering peg 49 in the half 47 and a corresponding centering hole 51 in the half 46.

In addition, the support 41 is divided into two structural blocks 53, 54 along a separating line 52 which extends transversely to the circumferential direction 44 so that for surveyance of a flat window, e.g., a skylight, only the lower structural block 54 will be necessary.

Figure 6:
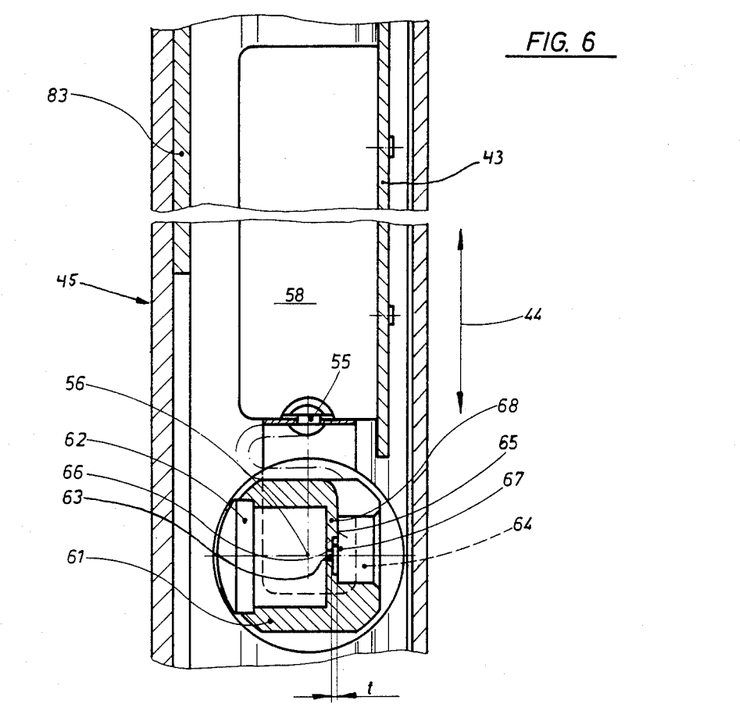
FIG. 6 is a sectional view showing further details of the invention.
Figure 7:
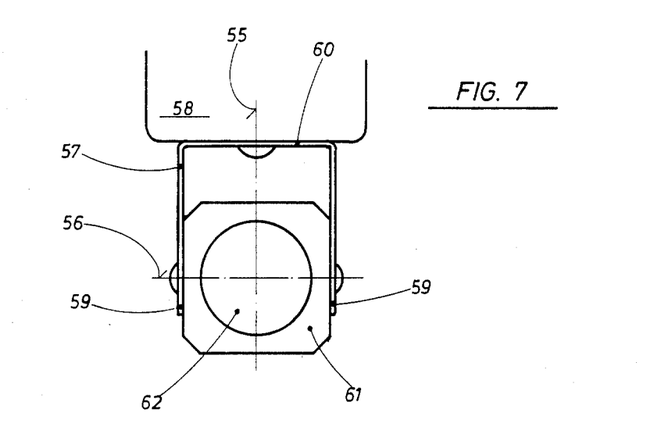
FIG. 7 is a front view showing a mounting system for a light transmitter used in the invention.

In the housing 45 which holds the light transmitters 25, 26, there is also arranged the light receivers 29 which are also supported on the mounting plate 43. This arrangement is depicted in FIGS. 6 and 7. In order to enable alignment of the light receivers 29 with the respective light transmitters, the receivers 29 are arranged so as to be swiveled by means of a hinge having two axes 55, 56 and they may be held in their respective swiveled positions. The axis 55 extends in the circumferential direction of the window 20, and the axis 56 extends transversely to the window plane.

Each light receiver 29 is held by means of a hinged trestle in the form of a U-shaped bracket 57 mounted at an electrical protective box 58 which is arranged in a manner (not shown) so as to be adjustable and fixable at the mounting plate 43 in the circumferential direction 44 of the window 20. For attachment of the light receivers, there are provided two hinge axes 55, 56 which penetrate the sides 59 or the bight 60 of the U-shaped bracket 57, as shown in FIG. 7, and which are riveted so as make turning difficult.

Each light receiver 29 consists of a housing 61 which includes a lens 62, a pinhole diaphragm 63, and a photodiode 64. The arrangement is such that the pinhole diaphragm 63 lies in the focus of the beams and serves on the side 65 thereof which faces the photodiode 64 for contact of the photodiode. On the side 65 of the pinhole diaphragm 63 which faces the photodiode 64 there is also provided a recess 66 for the purpose of creating a certain distance between the pinhole diaphragm 63 and the light-sensitive surface 67 of the photodiode 64.

As may be clearly seen in FIG. 6, the pinhole diaphragm 63 is formed by a wall 68 which extends integrally from the housing 61 and wherein there is provided the recess 66 on the side 65 which is directed toward the photodiode 64. The housing 61 is made of zinc die casting at which the pinhole diaphragm 63 as well as the recess 66 are formed in a single piece and simultaneously during manufacturing of the housing 61.

The housing 45 which holds the light transmitters 25, 26 is formed as a hollow section which extends over the entire length of the inner face of the sides 22 or 24 which is suitable to also hold the respective light receivers 29. The embodiment of the housing 45 is shown in FIG. 5. The housing consists of a U-shaped profile strip 70 which is attached with screws (not shown) at the inner face of the side 24 which is indicated in FIG. 5 in dash-dot form. A U-shaped cover strip 71 may be easily attached or detached at the side walls 73 and 74 of the profile strip 70, as shown at 72. The profile strip 70 as well as the cover strip 71 consist of extruded sections.

In order to receive the mounting plate 43, the profile rail 70 is formed in the region of its bottom 75 with two lateral longitudinal grooves 76, 77 of which one longitudinal groove 76 is covered to a small extent by a web 78 which projects from the side wall 73. At the other side wall 74, a longitudinal projection 79 is provided at a distance from the bottom 75 and from the mounting plate 43 in order to enable the mounting plate 43 to be held in place and to be slidable in the circumferential direction 44 of the window 20 and consequently in the longitudinal direction of the housing 45.

The mounting plate 43 is provided with a recess into which the spring clip 80 is inserted at its end facing away from the longitudinal projection 79 and the spring is thus secured in place. During tensioning by means of the spring clip 80, the mounting plate 43 is pressed against the longitudinal grooves 76, 77 which hold the plate.

Passage of light is ensured by means of oblong holes 82 which extend at the center and along the cover strip 71. The oblong holes 82 are dimensioned in such a way that a web 83 remaining between the holes 82 ensures necessary rigidity. The oblong holes 82 are arranged in an inwardly offset section 84 of the cover strip 71 and on the outside of the section 84 there is a T-shaped longitudinal groove 85 in the top side 86 of the cover strip 71. A strip 87 is held in the longitudinal groove 85, with the strip 87 having a corresponding T-shaped profile and being made of a material which is permeable to infrared light. The strip 87 extends over the entire length of the housing 45. Since the strip 87 and the housing 45 rest on a part of the window such as the windowsill or the inner face of the side 21, the strip 87 is held against sliding in the longitudinal direction of the housing 45 and thus in the circumferential direction 44 of the window 20.

On the outer side 88 of the bottom 75 of the housing 45 in the area of a corner 89, there is provided a longitudinal groove 90 into which a supporting strip 91 can be inserted if the inner face 24 is uneven or extends obliquely, as indicated in dash-dot line. The supporting strip 91 has a width b which is determined in accordance with the inner face 24 and which makes it possible to arrange the housing 45 in a correct position and thus to cover the gap 92 between the housing 45 and the inner face of the side 24.

The operation of the alarm system of the present invention is in accordance with generally known principles and thus a description thereof is not deemed necessary. However, it should be mentioned that it is possible in order to achieve an approximately equal intensity before the light receivers 29 to reduce the acute angle 36 between the longitudinal axes, i.e., directions of propagation 31, of the light transmitters 25, 26 with the increasing distance a between the light transmitters 25, 26 and the light receivers 29 or to increase the light intensity of the individual light transmitters 25, 26 with an increasing distance a.

In the alarm system described above, infrared light is preferably used. Of course, it is also possible within the scope of the invention to use light in the visible range or other beams.

In the embodiment depicted in FIG. 2, the lower boundary of the lower sector 35, as viewed in the direction of passage through the window 20, is defined by the inner face of the side 21 and the upper boundary of the upper sector 34 is defined by the inner face of the side 23, and thus the lower boundary of the sector 35 and the upper boundary of the sector 34 extend parallel to each other. With the arrangement shown in FIG. 2, the light beams in each of the sectors 34, 35 diverge or extend over an angular range indicated by the angle 36 of approximately 45°. In window cross-sections or door cross-sections to be secured, this provides an advantageous distribution of the passage sections which are irradiated by the two light barrier systems provided by the transmitters 25 and 26 so that, in view of the different cross-sectional dimensions of the passage to be secured, several light barriers may be arranged in a simple fashion, one above the other and they can be adapted to the existing dimensions of the passage.

When using conventional lenses, i.e., lenses which produce a luminous cone cross-section which is symmetrical with respect to the axis thereof, of course only a part of the available light beam can be utilized by the light receivers so that an irradiation loss may be anticipated. In the embodiments of the invention, this irradiation loss is kept as small as possible. In one embodiment of the invention, the light transmitters 6, 25, 26 may be provided with a lens which concentrates the light less strongly in the transverse plane of the passage or window 20 (preferably approximately 45°) than in the longitudinal plane of the passage (preferably approximately parallel up to approximately 5°). Thus, in such an embodiment a lens is used which produces a radiation cross-section which is narrower in the longitudinal plane of the passage and in the transverse plane corresponds to the desired angle of the section to be irradiated. Such a lens effects at the receiving area a beam cross-section which may be generally in the form of an oblong area. This beam may, for example, be taken up by a linear light receiver so that the radiation loss is extremely small.

In a further embodiment of the invention, this same advantage can also be achieved. In this further embodiment, light transmitters 6, 25, 26 consist of several individual transmitters which are arranged in the transverse plane of the passage 1, 20, with the light beams of these individual transmitters being preferably directed approximately parallel up to an angle of approximately 5° and enclosing between them the acute angle 12, 32. In this embodiment, the individual light transmitters are arranged one above the other, with light beams which diverge only very little and which enclose between them an acute angle. Also, in such an arrangement, a beam cross-section in the form of an oblong area is achieved so that the aforementioned advantages are also derived.

Since, in accordance with the present invention, each individual light transmitter has a light receiver assigned thereto, expenses may be kept within acceptable limits since linear light receivers are relatively expensive.

Additional advantages similar to those previously described may be obtained when the light transmitter which is closest to a side of one of the corners is arranged to direct the light beam, i.e., the axis of propagation 11 or 31, at an angle relative to the adjacent boundary of the window or opening at an acute angle. For example, in FIG. 2, it will be seen that the lowermost light transmitter 25 provides a light beam which extends at its axis of propagation 31 at an angle 38 relative to the inner side 21 of window 20. A similar angle 38 is provided between the side 23 and the next adjacent light beam. It has been found advantageous if the angle 38, or a similar angle 13 shown in FIG. 1, is arranged to be approximately 5°.

Furthermore, advantages are derived when the angle 36 is shown in FIG. 2 is arranged to be at approximately 40°.

In accordance with a further aspect of the invention, the individual light transmitters are combined as a single structural unit in the housing and thus not only are manufacturing costs considerably reduced, but assembly and disassembly are considerably simplified since only one structural part needs to be handled.

Furthermore, in accordance with the invention, the structural units comprising the light transmitters may be made in a uniform manner and merely by turning a structural unit by 180° it would be possible to use the same structural unit at different locations in the window 20 or other opening to be secured. Thus, in accordance with this aspect of the invention, it is possible to use the same light transmitters or structural units for passages to be secured which may be of different heights as well as of different widths, and it would be only necessary for the transmitters to be mounted at different angles relative to each other.

The housing for the alarm system of the present invention or an attached or installed portion of the housing which holds the individual light transmitters 6 is formed with surfaces which extend approximately at right angles with respect to the transverse plane of the passage, and these two adjacent surfaces are bent in such a way that they enclose an obtuse angle between them which is open toward the direction of propagation 11 of the light beams.

Furthermore, it will be seen that the housing 45 or the attached or installed portion thereof is formed with receiving bores 42 or the like for the individual light transmitters 25, 26 which lie in the transverse plane of the passage with their longitudinal axes or directions of propagation 31 enclosing between them acute angles 32 which are open in or toward the direction of propagation 31. With these embodiments, the purpose is to construct a support which holds the individual light transmitters in such a way that the individual transmitters, due to the design of the receptacles, will automatically be in the correct position after they are inserted. The specially arranged surfaces mentioned above and the receptacles or pockets formed by the bores 42 operate to accomplish this purpose.

In accordance with further, more detailed, aspects of the invention, it is possible to enhance the simplification of the device. It will be noted that the angles 12, 32 between the adjacent light transmitters 6, 25, 26 or the axes of the receptacles, i.e., receiving bores 42, are dimensioned in such a way that the light intensity before the light receivers 9, 29 is approximately equal. This makes it possible to provide the same light receivers or light transmitters or their supports at least for one of the light barrier systems. This is possible because the angle is dimensioned in such a way that the luminous intensity is approximately equal before longitudinal sections of the light receivers in which linear light receivers are arranged, or before the light receivers if several are arranged.

In a further aspect of the invention, the angles 12, 13 between the adjacent light transmitters 6, 25, 26 or the longitudinal axes of the receptacles, i.e., receiving bores 42, decrease with an increasing distance a in the direction of propagation 11, 31 between the light transmitters 6, 25, 26 and the receivers 9, 29. Thus, the directions of propagation of adjoining light transmitters or the longitudinal axes of the receptacles decrease with increasing distance in the direction of propagation between the individual light transmitters and the light receiver or the individual light receivers.

The light intensity of the light transmitters 6, 25, 26 correspondingly increases with an increasing distance a in the directionn of propagation 11, 31 between the light transmitters 6, 25, 26 and the receivers 9, 29 and thus an equal light intensity for the light receiver or the light receivers is taken into account in that the light intensity of the light intensity of the light transmitters increases accordingly with increasing distance in the direction of propagation between light transmitter and light receiver.

Since, in accordance with a further aspect of the invention, the direction of propagation 11, 31 of the light transmitter receptacle, i.e., the receiving bore 42, which is closest to the respective corner 8, 27, 28 encloses between itself and the periphery of the passage which is to be secured an angle 13, 38 which is approximately 5°, and since the angle 36 between the passage periphery and the more remote light beam is approximately 40°, utilization of the light beams which is as complete as possible may be accomplished wherein, as a result of these aspects of the invention, the distance between the beam direction and the circumference of the beam cross-section is considered. Thus, additional advantages may be derived.

The attached or installed portion or support 41 consists of at least two structural block 53, 54 which hold a part of the light transmitters 25, 26 and preferably can be placed one on the other. Thus, it is also possible to adapt the alarm according to the invention also to windows such as, for example, skylights which have a diagonal that extends under an angle which is less than 45°. Here it is provided that the support which holds the individual light transmitters consists of at least two structural blocks which hold a part of the light transmitters and can be placed one above the other. Consequently, it is possible for example in a support which consists of two structural blocks to use only the lower structural block for a skylight and thus to save not only light transmitters but also radiant energy.

In accordance with further aspects of the invention, the two halves 46 and 47 of the housing 7, 45 are arranged with a separating line 48 which extends through the longitudinal center of the receptacles or receiving bores 42 and the two halves may be locked in place relative to each other by the peg and hole arrangement 49, 51. Alternatively, the two halves 46, 47 may be glued or clamped together in a completely assembled state. As a result, manufacturing costs for the attached or installed part of the housing which represents the support for the light transmitter may be reduced and assembly and disassembly may be simplified. An attached or installed part equipped according to the invention may be difficult to manufacture because the longitudinal axes of the receptacles, pockets, or the like intersect and therefore this part can be manufactured only with difficulty as a part made of plastic or die cast metal. The bipartite support 41 enables an attached or installed part of plastic or die cast metal possible in that the part consists of two halves wherein the separating line extends through the longitudinal center of the receptacles. Due to this arrangement, the light transmitter can be easily inserted during assembly and removed for disassembly. This arrangement also facilitates the assembly in that the two halves will be centered and engaged together in a locked manner or alternatively may be clamped or glued together after assembly so that a firm structural part may be provided.

In a further aspect of the invention, the attached or installed portion or support 41 is held in the housing 45 in a manner enabling it to be adjustable and affixed at least in the circumferential direction 44 of the passage. This embodiment is particularly advantageous in an alarm with a light barrier which has several light receivers. This special embodiment makes it possible to adjust and lock the light transmitters in relation to the light receivers.

In accordance with a further aspect of the invention, the light transmitters 25, 26 and, optionally, also the light receivers 29 on one side of the passage, i.e., on the side 22 or 24, are held on one or on a common mounting plate 43 which is slidable and capable of being held in the circumferential direction 44 of the passage, in a U-shaped profiled strip 70 which extends approximately over the entire side 22, 24 onto which a cover strip 71 particularly provided with the oblong holes 82, preferably of a U-shaped cross-section, is clipped or screwed. In this arrangement, a special housing structure is provided for protecting the light transmitters. The essential features of this housing structure are the U-shaped profiled strip 70 which forms the housing in connection with the cover 71 which is also preferably U-shaped and which can be clipped or screwed in place. A mounting plate which is slidable and fixable in the housing in the circumferential direction of the passage to be secured is provided and holes having a preferably oblong configuration are provided in the cover for the passage of light. In addition, the profiled strip 70 extends approximately over the entire length of the respective passage side and is capable of holding all the light transmitters and also all the light receivers. The housing formed as indicated can be manufactured simply and economically for example from extrusions and it is also very easy to assemble because it is possible to align the light transmitters and, if necessary, also the light receivers in a simple manner which is possible without requiring movement of the housing particularly in view of the oblong holes which are provided in the cover.

The profiled strip 70 which holds the mounting plate 43 has in the region of its bottom 75 one or two laterally opposed longitudinal grooves 76, 77 wherein the longitudinal groove 76 on the side which is directed toward the cover strip 71 is covered by the web 78 and on the other side of the housing 45 above the longitudinal groove 77 a preferably round web 79 projects from the side wall 74 of the housing 45 under which the clip 80 can be placed which is applied at the mounting plate 43 or is inserted into the plate. As a result of this arrangement, it is possible to move and fix the mounting plate or plates simply and quickly in the housing. The spring clip serves for affixing the mounting plate 43 so that adjustment and affixation thereof can be undertaken simply and rapidly without tools.

In the top side 86 of the cover strip 71 there is provided a preferably T-shaped longitudinal groove 85 to receive an infrared light-permeable strip 87 having a corresponding profile which covers the holes, particularly the oblong holes 82. The light-permeable strip preferably terminates with the top side of the cover and, in this arrangement, the cover makes it possible, while maintaining passage of the light beam, to completely close the housing thereby protecting it against dirt. Furthermore, the housing thus structured is particularly advantageous in that it provides a practical construction as well as an attractive design.

On the underside of the bottom part of the profiled strip 70 in the region of the corner 89 there is arranged a longitudinal groove 92 extending in the longitudinal direction. The longitudinal groove, or recesses which lie one behind the other in the longitudinal direction are provided to make it possible to always insert a distance ledge of adjusted width and thus fix the housing in the profiled strip in the aligned position wherein the wedge-shaped gap which results between the profiled strip and the inner face of the ledge is covered thereby enabling the alarm to be set to the sidewalls of the passage to be secured, e.g., the inner faces of the window, which converge obliquely toward the outside.

The light receivers 9, 29 have a pinhole diaphragm 63 between their lenses and the light-sensitive surfaces 67, which is arranged a distance from said surfaces. The pinhole diaphragm 63 is arranged in a wall 68 which extends integrally from the housing 61 of the light receiver and at which the photodiode 64 rests and the side 65 which faces the photodiode 64 has a recess 66 which forms a distance t. This arrangement makes it possible for the housing of the light receiver which holds the lens to be manufactured with a specially arranged pinhole diaphragm in one piece, i.e., particularly as a sprayed plastic part or casting, for example a zinc die casting. Thus, a very significant decrease in manufacturing costs is possible because the housing is not only simpler to manufacture but also the assembly thereof is considerably simplified.

The light receivers 9, 29 can be swiveled about the axis 55 which extends in the circumferential direction 44 of the passage to be secured and about the axis 56 which extends along said passage and which also can be adjusted and fixed in the circumferential direction 44 of the passage. The light receivers 9, 29 are always attached by means of a hinge which has the axes 55, 56 at a holder arranged in the housing, particularly at an electrical protective box 58 which is held so as to be adjustable and affixable on the mounting plate 43 in the circumferential direction of the passage. The hinge is formed by means of a U-shaped bracket 57, as seen in the direction of propagation 11, 31 of the light beams, and the bight 60 of the bracket 57 is connected with the holder or the protective box 58 by the one axis 55 and the sides 59 of the bracket 57 are connected with the housing 61 of the light receivers 9, 29 by the other axis 56. The connection may be effected by rivets in such a way that rotation about the axis 55, 56 requires some effort so that the devices are not freely swingable.

This structural arrangement enables the light receiver to be arranged in a simple and practical manner so as to be adjustable in order to enable alignment easily and quickly with the light transmitter. The light receivers may be swiveled about an axis which extends along the passage and about an axis which extends in the circumferential direction of the passage and they can be adjustably held also in the circumferential direction of the passage.

In a preferred embodiment in accordance with the invention, the light receivers are attached by means of a hinge which has the aforementioned axes at the electrical protective box which is arranged in the housing. This protective box 58 is held at the mounting plate so as to be adjustable and capable of being fixed in the circumferential direction of the passage. In this arrangement, the light receivers will consequently form with the appropriate protective boxes a structural part which is advantageous particularly from the point of view of its wiring. The hinge which is provided is simple and economical to manufacture and meets the requirements in a satisfactory manner. The rivets which connect the light receivers through the hinge axis with the brackets, and if necessary, with the protective boxes are arranged in such a way that some effort is required for rotation thereby ensuring that undesired movement of the parts does not occur.

While specific embodiments of the invention have been shown and described in detail to illustrate the application of the inventive principles, it will be understood that the invention may be embodied otherwise without departing from such principles.

What is claimed is:

1. A security system for an opening such a door or window, said opening being defined to extend within a plane by a pair of linear boundary members located on opposite sides of said opening, said system comprising:
   an elongated housing extending longitudinally along each of said linear boundary members, each of said housings comprising
     a U-shaped profile strip adapted to be attached to said linear boundary members,
     at least one longitudinally extending groove formed in said profile strip,
     a cover strip attached to said profile strip,
     said cover strip having therein a plurality of longitudinally spaced apart holes each separated from an adjacent hole by an intermediate web,
     a filter member made of material permeable to infrared light extending essentially over the entire length of said housing covering each of said holes, and
     a plurality of mounting plates in each of said housings slidably engaged within said at least one groove and mounted in said housing to be independently selectively movable along said housing to selected positions;
   at least one infrared light transmitting unit mounted in each of said housings, each unit being diagonally offset relative to a transmitting unit in the other of said housings, each of said units including at least one infrared light transmitter with at least a plurality of said infrared light transmitters being provided in each of said housings; said plurality of infrared light transmitters being affixed to said mounting plates with each producing an infrared light beam which is limited in cross-sectional area and which is directed along a light axis extending in the plane of said opening which is offset relative to the axis of a light beam of an adjacent transmitter by an acute angle; and
   at least one infrared light receiving unit provided in each of said housings, each of said units having at least one individual infrared light receiver which is affixed to said mounting plate, with said light receivers being arranged in alignment with said light transmitters in the other of said housings to receive the light beams transmitted therefrom.

2. A system according to claim 1 wherein said opening is quadrilateral and includes a pair of opposed vertical sides and a pair of opposed horizontal sides wherein said light transmitters of each of said transmitting units are attached at said mounting plates adjacent one another in a row in the longitudinal direction of said housing along each of said vertical sides and wherein said light transmitters are arranged so that the angle between each of the light axes of the light emitted therefrom and the horizontal side closest thereto is within an angular range of between 5° and 40°.

3. A system according to claim 1 wherein said light transmitters of said transmitting units are arranged in a row in the longitudinal direction of said housing, said system further including support members having said light transmitters attached individually thereto with said support members being attached to said mounting plates, said transmitters being always arranged in groups of at least two transmitters each.

4. A system according to claim 3 wherein said support members are divided in two halves along a plane coinciding with the plane of said opening, said halves being centered relative to one another in an interlocked manner.

5. A system according to claim 1 wherein each of said light receivers is attached by means of a multiple hinge at said mounting plate in order to permit swiveling motion thereof about a first axis which extends in the longitudinal direction of said housing and about a second axis which extends transversely to the plane of said opening.

6. A system according to claim 1 wherein each of said light receivers comprises a housing part, a lens held at said housing part, a light sensitive element held at a distance from said lens at said housing part and wherein between said lens and said light sensitive element, an intermediate wall is provided which is formed in one piece at said housing part at a distance from said light sensitive element, said light sensitive element being in contact at said intermediate wall with the intermediate wall being provided with a pinhole diaphragm, a recess being provided on the side facing said light sensitive diaphragm at a predetermined distance between said pinhole diaphragm and said light sensitive element.

7. A system according to claim 1 wherein said at least one groove is formed in said U-shaped profile strip on one side thereof, said profile strip being formed on the opposite side thereof with a longitudinal web and at least one spring clip interposed between said longitudinal web and said mounting plate.

8. An assembly according to claim 1 wherein said cover strip has a longitudinal groove on the side thereof facing away from said profile strip, said longitudinal groove being formed with a T-shaped cross-section which extends in the longitudinal direction, said filter member being formed with a complementary cross-section and being inserted into said longitudinal groove.

9. A system according to claim 1 wherein said profile strip is formed with a spacing element adapted to be interposed between said profile strip and one of said linear boundary members when said housing is mounted on said linear boundary member in order to enable alignment therebetween.

* * * * *